United States Patent
Acharya et al.

(10) Patent No.: US 6,893,735 B2
(45) Date of Patent: May 17, 2005

(54) MAGNETIC RECORDING MEDIUM WITH ANTI-FERROMAGNETICALLY COUPLED MAGNETIC LAYERS, AND MAGNETIC STORAGE APPARATUS

(75) Inventors: B. Ramamurthy Acharya, San Jose, CA (US); E. Noel Abarra, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/444,107

(22) Filed: May 22, 2003

(65) Prior Publication Data

US 2004/0013910 A1 Jan. 22, 2004

Related U.S. Application Data

(63) Continuation of application No. PCT/JP00/08403, filed on Nov. 29, 2000.

(51) Int. Cl.⁷ ............................................. G11B 5/673
(52) U.S. Cl. ..................... 428/611; 428/668; 428/669; 428/678; 428/694 TM
(58) Field of Search ................. 428/611, 668, 428/669, 678, 694 TM

(56) References Cited

U.S. PATENT DOCUMENTS

| | | | |
|---|---|---|---|
| 5,583,727 A | 12/1996 | Parkin | 360/59 |
| 5,834,111 A | 11/1998 | Lal et al. | 428/332 |
| 5,851,656 A | 12/1998 | Ohkubo | 428/332 |
| 5,954,927 A | 9/1999 | Kobayashi et al. | 204/192.2 |
| 6,280,813 B1 | 8/2001 | Carey et al. | 428/65.3 |
| 6,372,330 B1 * | 4/2002 | Do et al. | 428/212 |
| 6,383,668 B1 * | 5/2002 | Fullerton et al. | 428/694 TM |
| 6,537,684 B1 * | 3/2003 | Doerner et al. | 428/611 |
| 6,602,612 B2 | 8/2003 | Abarra et al. | 428/611 |
| 6,610,424 B1 | 8/2003 | Acharya et al. | 428/694 TM |
| 6,753,072 B1 * | 6/2004 | Chen et al. | 428/216 |
| 2002/0064689 A1 * | 5/2002 | Yamanaka et al. | 428/694 TM |

FOREIGN PATENT DOCUMENTS

| | | |
|---|---|---|
| EP | 0 388 088 | 9/1990 |
| EP | 0 709 830 | 5/1996 |
| EP | 0 718 829 | 6/1996 |
| EP | 0 892 393 | 1/1999 |
| EP | 1 059 629 | 12/2000 |
| GB | 2 355 018 | 4/2001 |
| JP | 06-231958 | 8/1994 |

OTHER PUBLICATIONS

"Magnetic superlattics: molecular beam epitaxial growth and properties of artificially and naturally–layered structures," Farrow et al., Journal of Crystal Growth, North–Holland Publishing Co., Amsterdam, NL, vol. 150, No. 9714, May 1, 1995, pp. 1126–1131.

"Noise Properties of Multilayered Co–Alloy Magnetic Recording Media," Murdock et al., IEEE Transactions on Magnetics, IEEE Inc., NY, NY, vol. 25, No. 5, Sep. 1, 1990, pp. 2700–2705.

* cited by examiner

Primary Examiner—Kevin M. Bernatz
(74) Attorney, Agent, or Firm—Greer, Burns & Crain, Ltd.

(57) ABSTRACT

A magnetic recording medium includes a nonmagnetic underlayer, an initial magnetic layer, a nonmagnetic spacer layer provided on the initial magnetic layer, and a final magnetic layer provided on the nonmagnetic spacer layer. The initial magnetic layer is disposed closer to the nonmagnetic underlayer than the final magnetic layer, and the initial and final magnetic layers are made of mutually different compositions and are anti-ferromagnetically coupled.

10 Claims, 5 Drawing Sheets

Remanent Magnetization - Thickness Product (Gauss micron-m)

MAGNETIC RECORDING MEDIUM WITH ANTI-FERROMAGNETICALLY COUPLED MAGNETIC LAYERS, AND MAGNETIC STORAGE APPARATUS

This application is a continuation application claiming the benefit of a PCT International Application No. PCT/JP00/08403 filed Nov. 29, 2000 in the English language, in the Japanese Patent Office, the disclosure of which is hereby incorporated by reference.

The PCT International Application No. PCT/JP00/08403 was published under International Publication No. WO 02/45080 A1 in the English language on Jun. 6, 2002.

TECHNICAL FIELD

The present invention generally relates to magnetic recording media and magnetic storage apparatuses, and more particularly to a magnetic recording medium and a magnetic storage apparatus which are suited for high-density recording.

BACKGROUND ART

The storage capacity of longitudinal magnetic recording media has increased considerably due to the reduction of media noise and the development of high-sensitivity spin-valve heads and high-magnetization write heads. Recording densities above 50 Gbits/inch$^2$ have been demonstrated, and such high recording densities are on the verge of being applied for commercial hard disk drives. The demand for greater recording densities for better performing computers is however showing an increasing trend imposing greater challenges for the recording media and other component design.

Lowering the media noise involves writing sharper magnetic transitions in the magnetic layer. This is generally achieved by increasing the media coercivity, decreasing the thickness of the magnetic layer, decreasing the grain size and grain size distribution of the magnetic layer, and magnetically isolating the grains of the magnetic layer.

However, decreasing the grain size or decreasing the media thickness adversely affects the thermal stability of the magnetic recording medium. The thermal stability of the magnetic layer is normally represented by how large the factor KuV/kT is, where Ku denotes the magnetic anisotropy, V denotes the volume of the grain, T denotes the temperature, and k denotes the Boltzmann constant. In order to obtain small grains which are thermally stable, the magnetic anisotropy Ku has to be increased.

The magnetic anisotropy field Hk is defined by Hk=2Ku/Ms, where Ms denotes the saturation magnetization. A large magnetic anisotropy field Hk means a large coercivity Hc at the nonosecond regime where the writing of the information normally occurs for high recording density magnetic recording media with high data transfer rates. But a high coercivity Hc at the writing frequencies puts severe limitations on the write head, as a large write current is required in order to write the information on such magnetic recording media. The write current of the write head is severely limited due to difficulties in developing high magnetic moment write heads. The overwrite performance, which is the ability to write new data on previously written data, is worse for the magnetic recording media with a high magnetic anisotropy field Hk. Further, the magnetic recording media with a high magnetic anisotropy Ku increases the magnetic anisotropy field Hk, thereby restricting the overwrite performance.

As described above, there is a need to decrease the grain size of the magnetic layer and the thickness of the magnetic layer in order to achieve the low media noise and the high density recording performance. However, decreasing the grain size and the magnetic layer thickness deteriorates the thermal stability of the magnetic recording medium.

DISCLOSURE OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and a magnetic storage apparatus, which can improve the signal-to-noise ratio, the overwrite performance and the thermal stability.

Still another object of the present invention is to provide a magnetic recording medium comprising a nonmagnetic underlayer, an initial magnetic layer, a nonmagnetic spacer layer provided on the initial magnetic layer, and a final magnetic layer provided on the nonmagnetic spacer layer, where the initial magnetic layer is disposed closer to the nonmagnetic underlayer than the final magnetic layer, and the initial and final magnetic layers are made of mutually different compositions and being anti-ferromagnetically coupled. According to the magnetic recording medium of the present invention, it is possible to improve the signal-to-noise ratio, the overwrite performance and the thermal stability.

A further object of the present invention is to provide a magnetic recording medium comprising a nonmagnetic underlayer, an initial magnetic layer, a nonmagnetic spacer layer provided on the initial magnetic layer, and a final magnetic layer provided on the nonmagnetic spacer layer, where the initial magnetic layer is disposed closer to the nonmagnetic underlayer than the final magnetic layer, and the initial and final magnetic layers are anti-ferromagnetically coupled, and satisfy a relationship Msi<Msf, where Msi denotes a saturation magnetization of the initial magnetic layer and Msf denotes a saturation magnetization of the final magnetic layer. According to the magnetic recording medium of the present invention, it is possible to improve the signal-to-noise ratio, the overwrite performance and the thermal stability.

Another object of the present invention is to provide a magnetic recording medium comprising a nonmagnetic underlayer, an initial magnetic layer, a nonmagnetic spacer layer provided on the initial magnetic layer, and a final magnetic layer provided on the nonmagnetic spacer layer, where the initial magnetic layer is disposed closer to the nonmagnetic underlayer than the final magnetic layer, and the initial and final magnetic layers are anti-ferromagnetically coupled, and satisfy a relationship Hci<Hcf, where Hci denotes a coercivity of the initial magnetic layer and Hcf denotes a coercivity of the final magnetic layer. The coercivity of a magnetic layer depends on several factors such as the magnetic material, microstructure and thickness of the layer. Here, when a reference is made to the coercivity of the initial and final magnetic layers, the reference is being made to the coercivity of a single layer of the same thickness made of the initial magnetic layer and the final magnetic layer, respectively.

Still another object of the present invention is to provide a magnetic recording medium comprising a nonmagnetic underlayer, an initial magnetic layer, a nonmagnetic spacer layer provided on the initial magnetic layer, a middle magnetic layer provided on the nonmagnetic spacer layer, and a final magnetic layer provided on the middle magnetic layer, where the initial magnetic layer is disposed closer to the nonmagnetic underlayer than the middle and final magnetic layers, the initial and middle magnetic layers are anti-ferromagnetically coupled, the middle and final magnetic layers are ferromagnetically coupled, and at least two of the initial, middle and final magnetic layers are made of mutually different compositions. According to the magnetic recording medium of the present invention, it is possible to improve the signal-to-noise ratio, the overwrite performance and the thermal stability.

A further object of the present invention is to provide a magnetic recording medium comprising a nonmagnetic underlayer, an initial magnetic layer, a nonmagnetic spacer layer provided on the initial magnetic layer, a middle magnetic layer provided on the nonmagnetic spacer layer, and a final magnetic layer provided on the middle magnetic layer, where the initial magnetic layer is disposed closer to the nonmagnetic underlayer than the middle and final magnetic layers, the initial and middle magnetic layers are anti-ferromagnetically coupled, the middle and final magnetic layers are ferromagnetically coupled, and the initial, middle and final magnetic layers satisfy a relationship Msi≦Msm<Msf, where Msi denotes a saturation magnetization of the initial magnetic layer, Msm denotes a saturation magnetization of the middle magnetic layer and Msf denotes a saturation magnetization of the final magnetic layer. According to the magnetic recording medium of the present invention, it is possible to improve the signal-to-noise ratio, the overwrite performance and the thermal stability.

Another object of the present invention is to provide a magnetic recording medium comprising a nonmagnetic underlayer, an initial magnetic layer, a nonmagnetic spacer layer provided on the initial magnetic layer, a middle magnetic layer provided on the nonmagnetic spacer layer, and a final magnetic layer provided on the middle magnetic layer, where the initial magnetic layer is disposed closer to the nonmagnetic underlayer than the middle and final magnetic layers, the initial and middle magnetic layers are anti-ferromagnetically coupled, the middle and final magnetic layers are ferromagnetically coupled, and the initial and final magnetic layers are anti-ferromagnetically coupled, and satisfy a relationship Hci≦Hcm<Hcf, where Hci denotes a coercivity of the initial magnetic layer, Hcm denotes a coercivity of the middle magnetic layer and Hcf denotes a coercivity of the final magnetic layer. According to the magnetic recording medium of the present invention, it is possible to improve the signal-to-noise ratio, the overwrite performance and the thermal stability.

Still another object of the present invention is to provide a magnetic storage apparatus comprising at least one magnetic recording medium described above. According to the magnetic storage apparatus of the present invention, it is possible to improve the signal-to-noise ratio, the overwrite performance and the thermal stability.

Other objects and further features of the present invention will be apparent from the following detailed description when read in conjunction with the accompanying drawings.

BRIEF DESCRIPTION OF THE INVENTION

BEST MODE OF CARRYING OUT THE INVENTION

In order to improve the thermal stability of a magnetic recording medium without affecting the overwrite performance, a synthetic ferrimagnetic recording medium, comprising at least a pair of magnetic layers which are separated by a nonmagnetic spacer layer made of Ru, for example, is conceivable. In this conceivable ferrimagnetic recording medium, the magnetization of the upper magnetic layer is partially cancelled by the lower magnetic layer which acts as a stabilizing layer. While the read head is sensitive only to the effective magnetization, the total volume of the pair of upper and lower magnetic layers contributes to the thermal stability. Using this concept, the conceivable ferrimagnetic recording medium can greatly improve the signal-to-noise ratio (SNR) and the thermal stability.

However, there are demands to further reduce the media noise and to achieve higher recording densities. Accordingly, a description will now be given of various embodiments of a magnetic recording medium according to the present invention and a magnetic storage apparatus according to the present invention, which can further improve the SNR, the overwrite performance and the thermal stability, even when compared with the conceivable ferrimagnetic recording medium.

Figure 1:
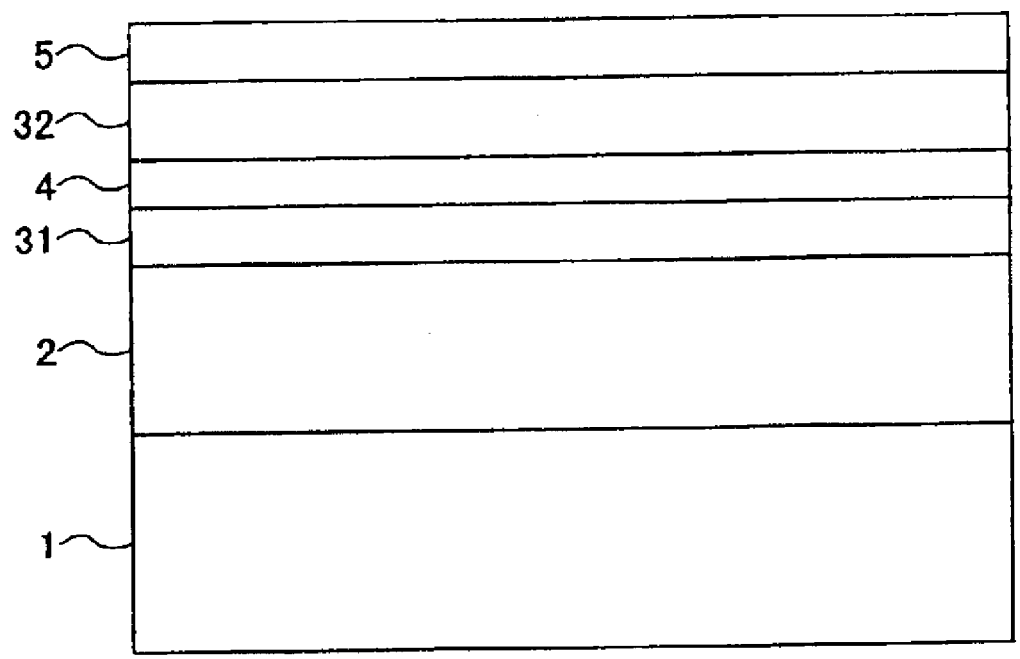
FIG. 1 is a cross sectional view showing an important part of a first embodiment of a magnetic recording medium according to the present invention.

A description will now be given of a first embodiment of the magnetic recording medium according to the present invention. FIG. 1 is a cross sectional view showing an important part of the first embodiment of the magnetic recording medium according to the present invention.

The magnetic recording medium shown in FIG. 1 generally includes a substrate 1, a nonmagnetic underlayer 2, an initial magnetic layer 31, a nonmagnetic spacer layer 4, a final magnetic layer 32, and a protection layer 5 which are stacked in this order.

The substrate 1 may be made of an Al-based alloy plated with NiP, glass with our without a NiP plating, Si, SiC or the like. The plated NiP film on the substrate 1 may be mechanically textured or oxidized.

The nonmagnetic underlayer 2 may also be made of Cr, a Cr-based alloy such as CrMo, CrTi, CrV and CrW, with a thickness of 1 to 25 nm. The nonmagnetic under layer 2 may also be made of an alloy with a B2 structure such as NiAl or FeAl, with a thickness of t to 80 nm.

The initial magnetic layer 31 may be made of CoCrTa, CoCrPt, CoCrPtB, CoCrPtTa, CoCrPtBCu, CoCrPtBAg, CoCrPtBRe, CoCrPtAu, CoCrPtW, CoCrPtTaNb, or alloys thereof, with a thickness of 1 to 10 nm.

The nonmagnetic spacer layer 4 may be made of Ru, Ir, Rh or alloys thereof, with a thickness of 0.4 to 1.0 nm.

The final magnetic layer 32 may be made of CoCrTa, CoCrPt, CoCrPtB, CoCrPtTa, CoCrPtBCu, CoCrPtBAg, CoCrPtBRe, CoCrPtAu, CoCrPtW, CoCrPtTaNb, or alloys thereof, with a thickness of 5 to 25 nm. However, the materials used for the initial magnetic layer 31 and the final magnetic layer 32 may be the same, but the compositions of the initial magnetic layer 31 and the final magnetic layer 32 are different. For example, the initial magnetic layer 31 is made of $Co_{60}Cr_{25}Pt_{10}B_5$, and the final magnetic layer 32 is made of $Co_{66}Cr_{20}Pt_{10}B_4$.

In this embodiment, the initial magnetic layer 31 and the final magnetic layer 32 are anti-ferromagnetically coupled. A saturation magnetization Msi of the initial magnetic layer 31 and a saturation magnetization Msf of the final magnetic layer 32 satisfy a relationship Msi≠Msf, so that the SNR is higher than a case where a relationship Msi=Msf stands. Preferably, the saturation magnetizations Msi and Msf satisfy a relationship Msi<Msf. In addition, a coercivity Hci of the initial magnetic layer 31 and a coercivity Hcf of the final magnetic layer 32 satisfy a relationship Hci≠Hcf, so that the SNR is higher than a case where a relationship Hci=Hcf stands. Preferably, the coercivities Hci and Hcf satisfy a relationship Hci<Hcf.

The protection layer 5 may be made of C, diamond-like C (DLC) or the like. Furthermore, an organic lubricant layer (not shown) may be provided on the protection layer 5.

In a first modification of the first embodiment of the magnetic recording medium, a nonmagnetic intermediate layer (not shown) is provided between the underlayer 2 and the initial magnetic layer 31. For example, the nonmagnetic intermediate layer may be made of a CoCr-based alloy with a thickness of 1 to 5 nm.

In a second modification of the first embodiment of the magnetic recording medium, more than one pair of the initial magnetic layer 31, the nonmagnetic spacer layer 4 and the final magnetic layer 32 are stacked, with a spacer magnetic layer between such pairs.

Figure 2:
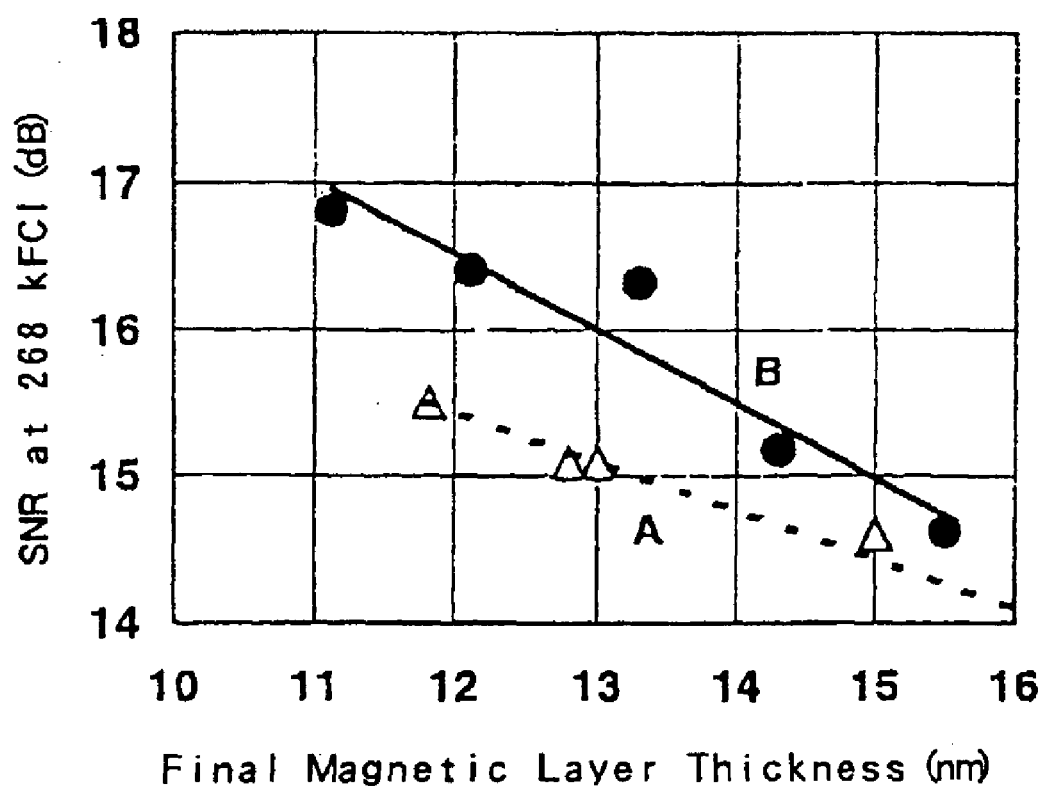
FIG. 2 is a diagram for explaining a signal-to-noise ratio of the first embodiment of the magnetic recording medium.

FIG. 2 is a diagram for explaining the SNR of the first embodiment of the magnetic recording medium. In FIG. 2, the ordinate indicates the SNR (dB) of the reproduced signal from the recording medium for 268 kFCI bits, and the abscissa indicates the thickness (nm) of the final magnetic layer 32. In addition, a symbol "●" indicates the SNR obtained for the first embodiment of the magnetic recording medium, and a symbol "Δ" indicates the SNR obtained for the conceivable ferrimagnetic recording medium for comparison purposes.

The SNR obtained for the first embodiment of the magnetic recording medium shown in FIG. 2 were obtained for the case where the initial magnetic layer 31 is made of $Co_{60}Cr_{25}Pt_{10}B_5$ and the final magnetic layer 32 is made of $Co_{66}Cr_{20}Pt_{10}B_4$. In addition, the saturation magnetization Msi of the initial magnetic layer 31 is 250 emu/cc, and the saturation magnetization Msf of the final magnetic layer 32 is 380 emu/cc. Furthermore, the coercivity Hci of the initial magnetic layer 31 is 2700 Oe, and the coercivity Hcf of the final magnetic layer 32 is 3840 Oe. In other words, the composition, the saturation magnetization and the coercivity of the initial magnetic layer 31 are different from those of the final magnetic layer 32.

On the other hand, the SNR obtained for the conceivable ferrimagnetic recording medium shown in FIG. 2 were obtained for the case where the lower magnetic layer and the upper magnetic layer are both made of $Co_{66}Cr_{20}Pt_{10}B_4$, that is, the same composition. In addition, the saturation magnetizations of the upper and lower magnetic layers of the conceivable ferrimagnetic recording medium are 380 emu/cc and are the same. Moreover, the coercivities of the upper and lower magnetic layers of the conceivable ferrimagnetic recording medium are 3840 Oe and are the same.

It may be seen from FIG. 2 that the SNR of the first embodiment of the magnetic recording medium is improved over the SNR of the conceivable ferrimagnetic recording medium.

Figure 3:
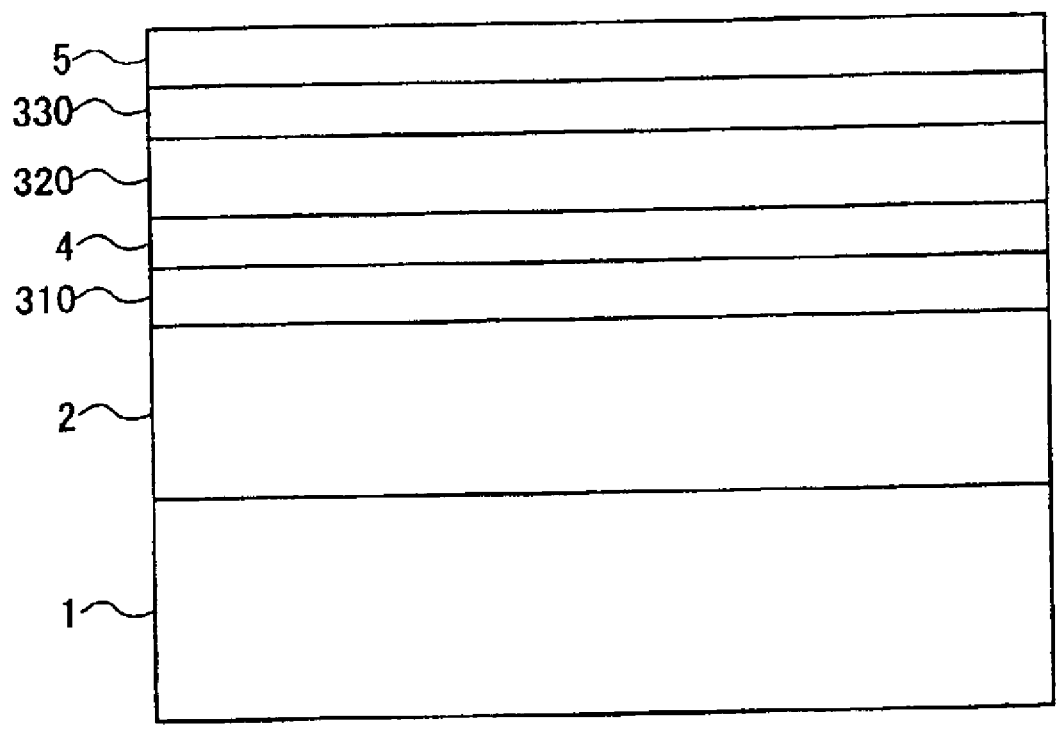
FIG. 3 is a cross sectional view showing an important part of a second embodiment of the magnetic recording medium according to the present invention.

Next, a description will be given of a second embodiment of the magnetic recording medium according to the present invention. FIG. 3 is a cross sectional view showing an important part of the second embodiment of the magnetic recording medium according to the present invention. In FIG. 3, those parts which are the same as those corresponding parts in FIG. 1 are designated by the same reference numerals, and a description thereof will be omitted.

The magnetic recording medium shown in FIG. 3 includes an initial magnetic layer 310 provided on the nonmagnetic underlayer 2, a middle magnetic layer 320 provided on the nonmagnetic spacer layer 4, and a final magnetic layer 330 provided on the middle magnetic layer 320.

In this embodiment, the initial magnetic layer 310 and the middle magnetic layer 320 may be made of a $CoCr_{x1}$-based alloy, where 15<x1<27, and the final magnetic layer 330 may be made of a $CoCr_{y1}$-based alloy, where 10<y1<24. In this case, the thicknesses of the initial, middle and final magnetic layers 310, 320 and 330 may respectively be 1 to 10 nm, 1 to 10 nm and 5 to 25 nm.

Alternatively, the initial magnetic layer 310 and the middle magnetic layer 320 may be made of a $CoCrB_{x2}$-based alloy, where 1<x2<15, and the final magnetic layer 330 may be made of a $CoCrB_{y2}$-based alloy, where $0 \leq y2 < 10$. In this case, the thicknesses of the initial, middle and final magnetic layers 310, 320 and 330 may respectively be 1 to 10 nm, 1 to 10 nm and 5 to 25 nm.

In addition, the initial magnetic layer 310 and the final magnetic layer 330 may be made of CoCrTa, CoCrPt, CoCrPtB, CoCrPtTa, CoCrPtBCu, CoCrPtBAg, CoCrPtBRe, CoCrPtAu, CoCrPtW, CoCrPtTaNb, or alloys thereof.

In this embodiment, the initial magnetic layer 310 is anti-ferromagnetically coupled to the middle magnetic layer 320, and the middle magnetic layer 320 is ferromagnetically coupled to the final magnetic layer 330. A saturation magnetization Msi of the initial magnetic layer 310, a saturation magnetization Msm of the middle magnetic layer 320 and a saturation magnetization Msf of the final magnetic layer 330 satisfy at least two of relationships Msi≠Msm, Msm≠Msf and Msi≠Msf so that the SNR is higher than a case where a relationship Msi=Msm=Msf stands. Preferably, the saturation magnetizations Msi, Msm and Msf satisfy a relationship Msi≦Msm<Msf. In addition, a coercivity Hci of the initial magnetic layer 310, a coercivity Hcm of the middle magnetic layer 320 and a coercivity Hcf of the final magnetic layer 330 satisfy at least two of relationships Hci≠Hcm, Hcm≠Hcf and Hci≠Hcf so that the SNR is higher than a case where a relationship Hci=Hcm=Hcf stands. Preferably, the coercivities Hci, Hcm and Hcf satisfy a relationship Hci≦Hcm<Hcf.

In a first modification of the second embodiment of the magnetic recording medium, a nonmagnetic intermediate layer (not shown) is provided between the underlayer 2 and the initial magnetic layer 310. For example, the nonmagnetic intermediate layer may be made of a CoCr-based alloy with a thickness of 1 to 5 nm.

In a second modification of the second embodiment of the magnetic recording medium, more than one pair of the initial magnetic layer 310, the nonmagnetic spacer layer 4, the middle magnetic layer 320 and the final magnetic layer 330 are stacked, with a spacer magnetic layer between such pairs.

Figure 4:
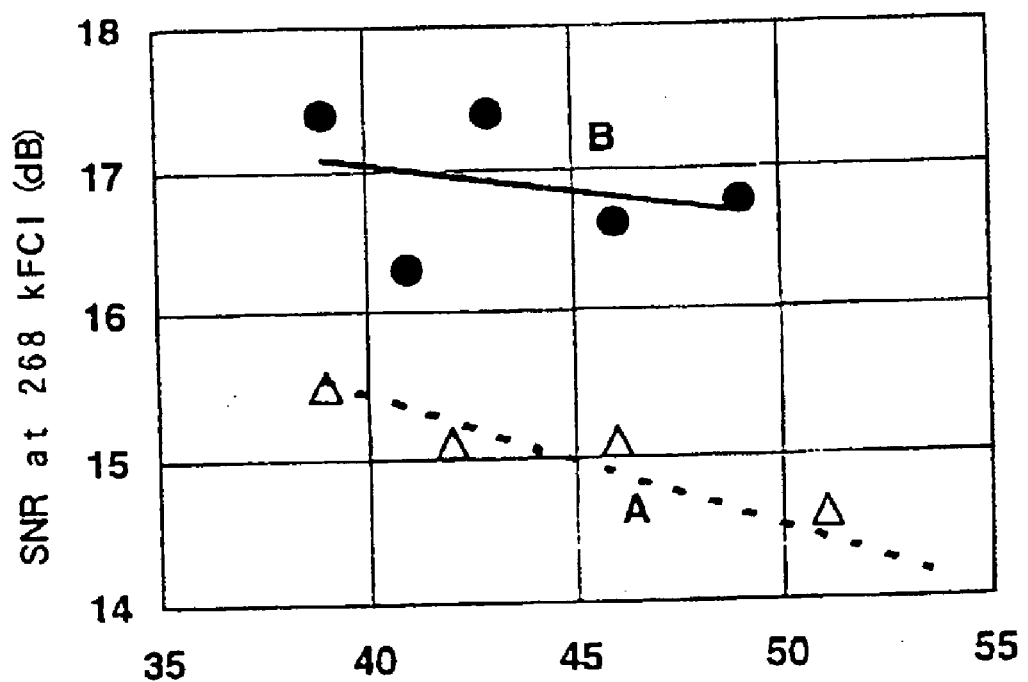
FIG. 4 is a diagram for explaining the signal-to-noise ratio of the second embodiment of the magnetic recording medium.

FIG. 4 is a diagram for explaining the SNR of the second embodiment of the magnetic recording medium. In FIG. 4, the ordinate indicates the SNR (dB) of the reproduced signal from the recording medium for 268 kFCI bits, and the abscissa indicates the effective remanent magnetization—thickness product (Gauss micron-m) of the initial, middle and final magnetic layers 310, 320 and 330. In addition, a symbol "●" indicates the SNR obtained for the second embodiment of the magnetic recording medium, and a symbol "Δ" indicates the SNR obtained for a modified conceivable ferrimagnetic recording medium for comparison purposes.

The SNR obtained for the second embodiment of the magnetic recording medium shown in FIG. 4 were obtained for the case where the initial magnetic layer 310 and the middle magnetic layer 320 are both made of $Co_{60}Cr_{25}Pt_{10}B_5$ and the final magnetic layer 330 is made of $Co_{66}Cr_{20}Pt_{10}B_4$. In addition, the saturation magnetizations Msi and Msm of the initial and middle magnetic layers 310 and 320 are both 250 emu/cc, and the saturation magnetization Msf of the final magnetic layer 330 is 380 emu/cc. Furthermore, the coercivities Hci and Hcm of the initial and middle magnetic layers 310 and 320 are both 2700 Oe, and the coercivity Hcf of the final magnetic layer 330 is 3840 Oe. In other words, the composition, the saturation magnetization and the coercivity of are different for at least two of the initial, middle and final magnetic layers 310, 320 and 330.

On the other hand, the SNR obtained for the modified conceivable ferrimagnetic recording medium shown in FIG. 4 were obtained for the case where the lower magnetic layer, a middle magnetic layer and the upper magnetic layer are all made of $Co_{66}Cr_{20}Pt_{10}B_4$, that is, the same composition. In addition, the saturation magnetizations of the upper, middle and lower magnetic layers of the modified conceivable ferrimagnetic recording medium are 380 emu/cc and are the same. Moreover, the coercivities of the upper, middle and lower magnetic layers of the modified conceivable ferrimagnetic recording medium are 3840 Oe and are the same.

It may be seen from FIG. 4 that the SNR of the second embodiment of the magnetic recording medium is improved over the SNR of the modified conceivable ferrimagnetic recording medium.

Figure 5:
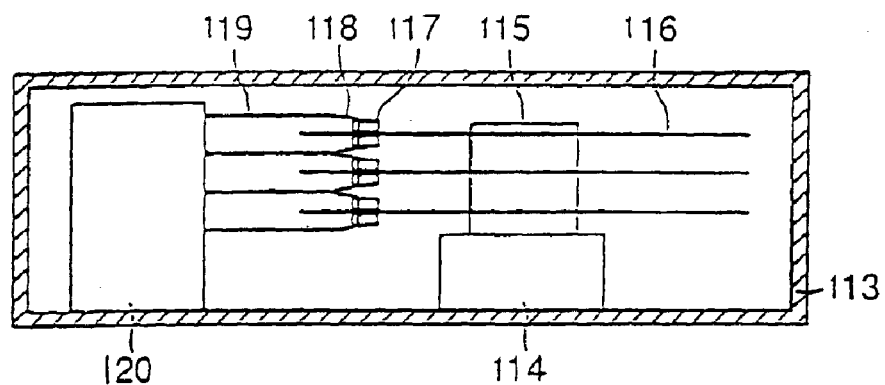
FIG. 5 is a cross sectional view showing an important part of an embodiment of a magnetic storage apparatus according to the present invention.

Next, a description will be given of an embodiment of a magnetic storage apparatus according to the present invention, by referring to FIGS. 5 and 6. FIG. 5 is a cross sectional view showing an important part of this embodiment of the magnetic storage apparatus, and FIG. 6 is a plan view showing the important part of this embodiment of the magnetic storage apparatus.

Figure 6:
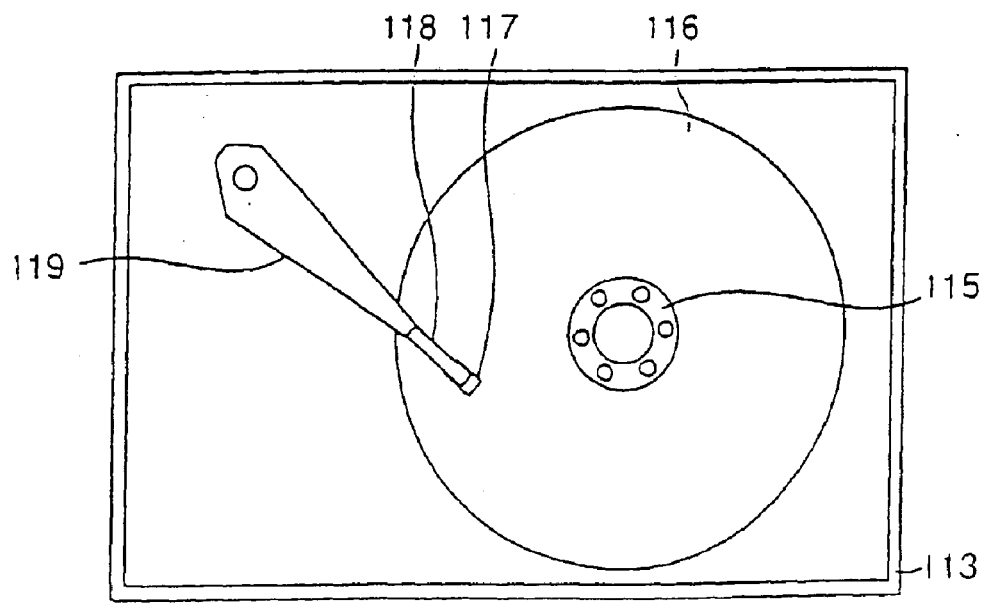
FIG. 6 is a plan view showing the important part of the embodiment of the magnetic storage apparatus.

As shown in FIGS. 5 and 6, the magnetic storage apparatus generally includes a housing 113. A motor 114, a hub 115, a plurality of magnetic recording media 116, a plurality of recording and reproducing heads 117, a plurality of suspensions 118, a plurality of arms 119, and an actuator unit 120 are provided within the housing 113. The magnetic recording media 116 are mounted on the hub 15 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of any of the first and second embodiments and the modifications of the magnetic recording medium described above in conjunction with FIGS. 1 through 4. Of course, the number of magnetic recording media 116 is not limited to three, and only one, two or four or more magnetic recording media 116 may be provided.

The basic construction of the magnetic storage unit is not limited to that shown in FIGS. 5 and 6. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:

a nonmagnetic underlayer;

an initial magnetic layer;

a nonmagnetic spacer layer provided on the initial magnetic layer;

a middle magnetic layer provided on the nonmagnetic spacer layer; and a final magnetic layer provided on the middle magnetic layer, said initial magnetic layer being disposed closer to said nonmagnetic underlayer than said middle and final magnetic layers, said initial and middle magnetic layers being antiferromagnetically coupled, said middle and final magnetic layers being ferromagnetically coupled, at least two of said initial, middle and final magnetic layers being made of mutually different compositions, said initial, middle and final magnetic layers satisfying the relationships Hci≠Hcm, and Hci≠Hcf, where Hci denotes a coercivity of the initial magnetic layer, Hcm denotes a coercivity of the middle magnetic layer and Hcf denotes a coercivity of the final magnetic layer wherein said final magnetic layer is directly deposited on said middle magnetic layer.

2. The magnetic recording medium as claimed in claim 1, wherein said initial, middle and final magnetic layers satisfy at least two of relationships Msi≠Msm, Msm≠Msf and Msi≠Msf where Msi denotes a saturation magnetization of the initial magnetic layer, Msm denotes a saturation magnetization of the middle magnetic layer and Msf denotes a saturation magnetization of the final magnetic layer.

3. A magnetic recording medium comprising:

a nonmagnetic underlayer;

an initial magnetic layer;

a nonmagnetic spacer layer provided on the initial magnetic layer;

a middle magnetic layer provided on the nonmagnetic spacer layer; and a final magnetic layer provided on the middle magnetic layer, said initial magnetic layer being disposed closer to said nonmagnetic underlayer than said middle and final magnetic layers, said initial and middle magnetic layers being antiferromagnetically coupled, said middle and final magnetic layers being ferromagnetically coupled, said initial, middle and final magnetic layers satisfying a relationship Msi ≦Msm<Msf, where Msi denotes a saturation magnetization of the initial magnetic layer, Msm denotes a saturation magnetization of the middle magnetic layer and Msf denotes a saturation magnetization of the final magnetic layer.

4. A magnetic recording medium comprising:

a nonmagnetic underlayer;

an initial magnetic layer;

a nonmagnetic spacer layer provided on the initial magnetic layer; a middle magnetic layer provided on the nonmagnetic spacer layer; and a final magnetic layer provided on the middle magnetic layer, said initial magnetic layer being disposed closer to said nonmagnetic underlayer than said middle and final magnetic layers, said initial and middle magnetic layers being anti-ferromagnetically coupled, said middle and final magnetic layers being ferromagnetically coupled, said initial and final magnetic layers being anti-ferromagnetically coupled, and satisfying a relationship Hci≦Hcm<Hcf, where Hci denotes a coercivity of the initial magnetic layer, Hcm denotes a coercivity of the middle magnetic layer and Hcf denotes a coercivity of the final magnetic layer.

5. The magnetic recording medium as claimed in claim 1, wherein more than one pair of the initial magnetic layer, the nonmagnetic spacer layer, the middle magnetic layer and the final magnetic layer are provided with a spacer magnetic layer disposed between such pairs.

6. The magnetic recording medium as claimed in claim 1, wherein said initial and middle magnetic layers are made of a $CoCr_{x1}$-based alloy, where 15<x1<27, and said final magnetic layer is made of a $CoCr_{y1}$-based alloy, where 10<y1<24.

7. The magnetic recording medium as claimed in claim 1, wherein said initial and middle magnetic layers are made of a $CoCrB_{x2}$-based alloy, where 1<x2<15, and said final magnetic layer is made of a $CoCrB_{y2}$-based alloy, where 0≦y2<10.

8. The magnetic recording medium as claimed in claim 1, wherein said initial and final magnetic layers are made of a material selected from a group of CoCrTa, CoCrPt, CoCrPtB, CoCrPtTa, CoCrPtBCu, CoCrPtBAg, CoCrPtBRe, CoCrPtAu, CoCrPtW, CoCrPtTaNb, and alloys thereof.

9. The magnetic recording medium as claimed in claim 1, wherein said nonmagnetic spacer layer is made of a material selected from a group of Ru, Ir, Rh and alloys thereof.

10. A magnetic storage apparatus comprising:

at least one magnetic recording medium, the recording medium comprising:

a nonmagnetic underlayer;

an initial magnetic layer;

a nonmagnetic spacer layer provided on the initial magnetic layer;

a middle magnetic layer provided on the nonmagnetic spacer layer; and a final magnetic layer provided on the middle magnetic layer, said initial magnetic layer being disposed closer to said nonmagnetic underlayer than said middle and final magnetic layers, said initial and middle magnetic layers being anti-ferromagnetically coupled, said middle and final magnetic layers being ferromagnetically coupled, said initial, middle and final magnetic layers satisfying a relationship Hci≠Hcm and Hci≠Hcf or, a relationship Msi≦Msm<Msf or, a relationship Hci≦Hcm<Hcf, where Msi denotes a saturation magnetization of the initial magnetic layer, Msm denotes a saturation magnetization of the middle magnetic layer, Msf denotes a saturation magnetization of the final magnetic layer, and Hci, Hcm and Hcf denote coercivities of the initial, middle and final magnetic layers respectively, and wherein said final magnetic layer is directly deposited on said middle magnetic layer.

* * * * *